United States Patent
DeCesaris et al.

(10) Patent No.: US 8,898,358 B2
(45) Date of Patent: Nov. 25, 2014

(54) MULTI-PROTOCOL COMMUNICATION ON AN I2C BUS

(75) Inventors: Michael DeCesaris, Carrboro, NC (US); Pravin S. Patel, Cary, NC (US); Luke D. Remis, Raleigh, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/541,749

(22) Filed: Jul. 4, 2012

(65) Prior Publication Data

US 2014/0013017 A1 Jan. 9, 2014

(51) Int. Cl.
*G06F 13/42* (2006.01)
*G06F 13/40* (2006.01)
*G06F 13/38* (2006.01)

(52) U.S. Cl.
CPC .......... *G06F 13/385* (2013.01); *G06F 13/4027* (2013.01)
USPC .......................................... 710/105; 710/315

(58) Field of Classification Search
CPC  G06F 9/4411; G06F 13/4027; G06F 13/4031
USPC .................. 710/104–110, 306–315
See application file for complete search history.

(56) References Cited

U.S. PATENT DOCUMENTS

| | | | |
|---|---|---|---|
| 6,738,856 B1 * | 5/2004 | Milley et al. ................... | 710/315 |
| 7,039,734 B2 * | 5/2006 | Sun et al. ....................... | 710/110 |
| 7,694,053 B2 * | 4/2010 | Kippley et al. ................ | 710/110 |
| 7,808,277 B2 * | 10/2010 | Rodriguez et al. ............. | 326/86 |
| 7,882,282 B2 * | 2/2011 | Haban et al. ................... | 710/38 |
| 7,913,012 B2 * | 3/2011 | Piasecki et al. ............... | 710/110 |
| 2009/0157929 A1 | 6/2009 | Pigott et al. | |
| 2010/0017553 A1 | 1/2010 | Laurencin et al. | |
| 2010/0066409 A1 * | 3/2010 | Rodriguez et al. ............. | 326/62 |
| 2010/0122002 A1 | 5/2010 | Lory et al. | |
| 2011/0099310 A1 | 4/2011 | Haban et al. | |
| 2011/0208885 A1 * | 8/2011 | Kwek et al. .................... | 710/107 |
| 2012/0054389 A1 * | 3/2012 | Lee ................................ | 710/106 |
| 2012/0072629 A1 * | 3/2012 | Tokuda ........................... | 710/110 |
| 2012/0284429 A1 * | 11/2012 | Adkins et al. .................. | 710/3 |

FOREIGN PATENT DOCUMENTS

CN          101763331          6/2010

OTHER PUBLICATIONS

RD538047A, Feb. 10, 2009.
Leens, "An Introduction to I2C and SPI protocols", IEEE Instrumentation and Measurement Magazine, Feb. 2009.
Perez, Oscar, Routing Method and Apparatus for Increasing the Number of I2C Slave Devices that can be Accessed . . . , Hewlett-Packard, Research Disclosure, Feb. 2009.

* cited by examiner

*Primary Examiner* — Raymond Phan
(74) *Attorney, Agent, or Firm* — Steven M. Greenberg, Esq.; CRGO Law

(57) ABSTRACT

A method, device and computer program product for providing multi-protocol communication on an inter-integrated circuit (I2C) bus. The method for providing multi-protocol communication on an inter-integrated circuit (I2C) bus can include issuing a start command by a bus management device onto the I2C bus. Thereafter, the bus management device can send an embedded differential protocol to a non-I2C device. Once communication with the non-I2C device is completed, the bus management device can issue a stop command to release the I2C bus. In one aspect of this embodiment, the method can include receiving a response from the non-I2C device.

14 Claims, 3 Drawing Sheets

US 8,898,358 B2

MULTI-PROTOCOL COMMUNICATION ON AN I2C BUS

BACKGROUND OF THE INVENTION

1. Field of the Invention

The present invention relates to bus interfaces and more particularly to a bus management interface that drives I2C and a high-speed interconnect interchangeably.

2. Description of the Related Art

Many similarities exist between seemingly unrelated designs in consumer, industrial and telecommunication electronics. Examples of similarities include intelligent control, general-purpose circuits (e.g., LCD drivers, I/O ports, RAM) and application-oriented circuits. The Inter-Integrated Circuit (I2C) bus is a bi-directional two-wire serial bus designed to exploit these similarities.

I2C buses can connect a number of devices simultaneously to the same pair of bus wires. Normally, the device addresses on the I2C bus are predefined by hardwiring on the circuit boards. A limitation of the v bus is that it will only allow a single device (e.g., an expansion board) to respond to each even address between 00 and FF. All addresses are even because only the high-order seven bits of the address byte are used for the address. Bit 0 is used to indicate whether the operation is to be a read or a write. Therefore, there are a limited number of addresses that can be assigned to a device.

With complex servers such as the IBM x3750 ("Kong"), many control signals from the base planer, need to be routed up to the CPU riser card. The signals are connected to the riser card using a backplane connector (e.g., a TinMan connector), but in most cases large numbers of pins are taken by chipset (e.g., an Intel chipset) required signals. As a result, only a small number of spare pins on the backplane connector remain for use by system management like functions. In many cases, the remaining pins are used for I2C communication. Many I2C devices are interrupt-driven and therefore stand idle for long periods of time not being used.

BRIEF SUMMARY OF THE INVENTION

Embodiments of the present invention address deficiencies of the art in respect to bus interfaces and provide a novel and non-obvious method, system and computer program product for providing multi-protocol communication on an inter-integrated circuit (I2C) bus. In an embodiment of the invention, a method for providing multi-protocol communication on an inter-integrated circuit (I2C) bus is provided. The method can include issuing a start command by a bus management device onto the I2C bus. Thereafter, the bus management device can send an embedded differential protocol to a non-I2C device. Once communication with the non-I2C device is completed, the bus management device can issue a stop command to release the I2C bus. In one aspect of this embodiment, the method can include receiving a response from the non-I2C device.

In another embodiment of the invention, an I2C bus system configured for multi-protocol communication including a bus management device coupled to an expansion unit and the I2C bus and bus protocol selection logic comprising program code enabled to issue a start command by a bus management device onto the I2C bus, to send an embedded differential protocol by the bus management device to a non-I2C device and to issue a stop command by the bus management device onto the I2C bus is provided.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide for a novel and non-obvious method, system and computer program product for providing multi-protocol communication on an inter-integrated circuit (I2C) bus. In accordance with an embodiment of the invention, a method for providing multi-protocol communication on an inter-integrated circuit (I2C) bus can include issuing a start command by a bus management device onto the I2C bus. Thereafter, the bus management device can send an embedded differential protocol to a non-I2C device. Once communication with the non-I2C device is completed, the bus management device can issue a stop command to release the I2C bus. In one aspect of this embodiment, the method can include receiving a response from the non-I2C device.

Figure 1:
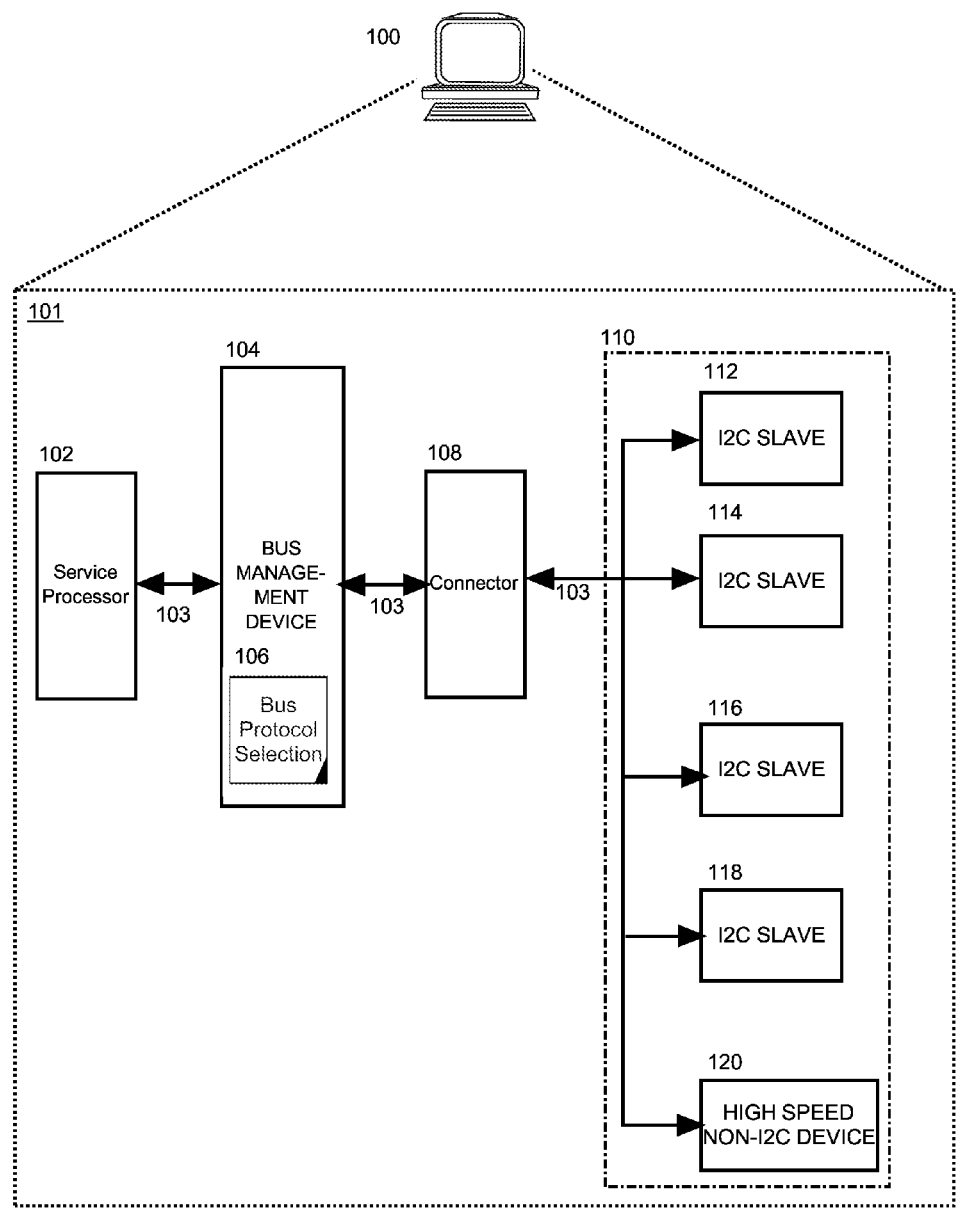
FIG. 1 is a schematic illustration of a data processing system that includes a bus management device having bus protocol selection logic, a connector and a expansion unit.

In illustration, FIG. 1 is a schematic of data processing system that includes a chassis/slot, an input/output (I/O) expansion adapter and a bus management device. Data processing system 100, e.g., a server, can include a chassis/slot 101, a service processor 102, a bus management device 104, an expansion unit connector 108, e.g., a riser board connector, an I2C bus 103, and an expansion unit 108 (e.g., a CPU riser card). In one embodiment, data processing system 100 employs an I2C bus architecture. The I2C bus 103 is a bidirectional serial bus requiring only two wires: serial data line (SDA) and serial clock line (SCL). Although serial buses do not have the throughput capability of parallel buses, serial buses require less wiring and fewer Integrated Circuit (IC) connector pins. Each device (bus management device 104, expansion board connector 108, and any other I2C compatible devices 112, 114, 116, 118) connected to I2C bus 103 is software addressable by a unique address. These devices can operate as either transmitters or receivers.

All I2C bus compatible devices have an on-chip interface which allows the devices to communicate directly with each other via the I2C bus 103. A simple master/slave relationship exists at all times. A master is a device which initiates a data transfer and the clock signals to permit the transfer, and any device addressed at the time of transfer is considered a slave. The I2C bus 103 is a multi-master bus, meaning more than one device capable of controlling the bus can be connected to it. However, the present implementation is operated in a single-master mode. The expansion unit 110, the expansion board connector 108 and the bus management device 104 are communicatively linked to the other over the I2C bus 103.

Service processor 102 can include an operating system that supports the operation of bus protocol selection logic 106 configured to provide multiple bus protocols over a conventional I2C bus 103. Bus protocol selection logic 106 can include program code enabled to issue a start command by a bus management device 104 onto the I2C bus 103, to send an embedded differential protocol by the bus management device 104 to a non-I2C device 120 and to issue a stop command by the bus management device 104 onto the I2C bus 103. Bus protocol selection logic 106 further can include program code to receive a response from the non-I2c device 120.

Notably, the START and STOP conditions of the I2C protocol and the large range of the I2C's voltage input low level (VIL) can be exploited to provide for multiple protocol communication across the I2C bus. The I2C specification states that any voltage less than 0.9V are considered a logic low. Within the 0.0V to 0.9V range, there is sufficient room for the bus management device 104 to drive a low-voltage differential pair to communicate with non-I2C devices 120 downstream.

Figure 2:
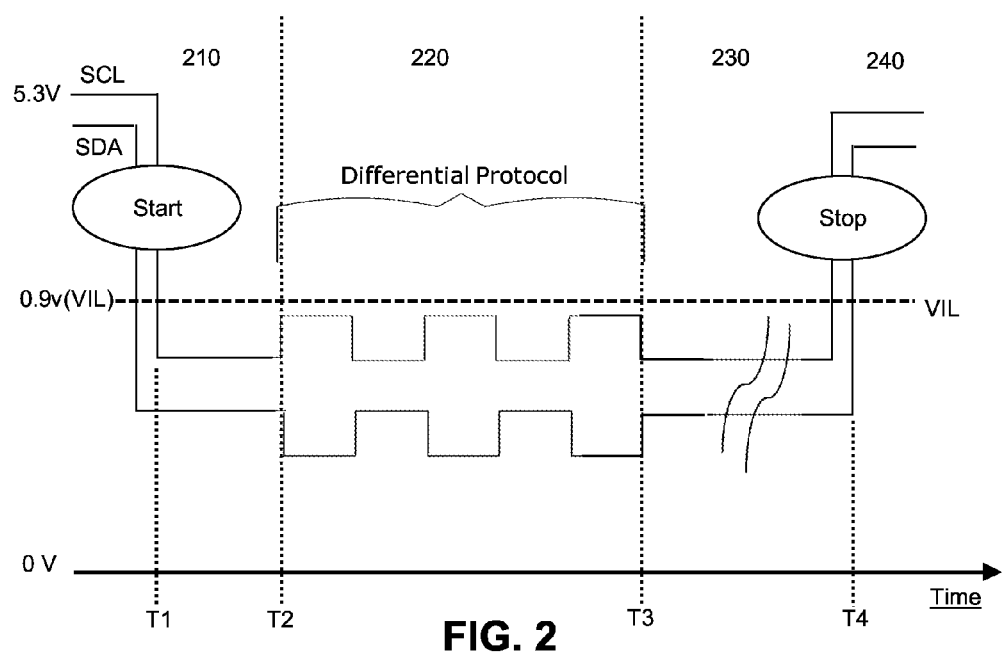
FIG. 2 is a timing diagram of a bus management device configured for multiple protocols over an I2C bus; and, FIG. 3 is a flow chart illustrating a process to provide multiple protocols over an I2C bus.

In yet further illustration, FIG. 2 is a timing diagram of a bus management device configured for providing multiple protocols over an I2C bus. As shown in FIG. 2, in stage 210, SDA signal goes low followed by the SCL signal going low (at T1) to generate a START command. The voltage will be a voltage less than 0.9V, which the I2C specification lists as being a logical low. In stage 220, at T2, a differential protocol is transmitted by the bus management device 104 and received by the non-I2C device 120. By communicating in the I2C logical low region, current I2C slave devices 112, 114, 116 and 118 do not respond or interfere. The differential protocol can be can be any of several standard differential protocols, such as Universal Serial Bus (USB) protocol, Peripheral Component Interconnect Express Serial Bus (PCIe) protocol (using a low swing mode) and the like. The downstream non-I2C target (e.g., non-I2C device 120) decodes the differential protocol pair and communicates directly with the bus management device 104. The communication can be performed at higher speeds than the I2C protocol will allow. In stage 230, at T4, the bus management device 104 can generate a STOP command by causing the SDA signal to go high followed by the SCL signal going high.

Figure 3:
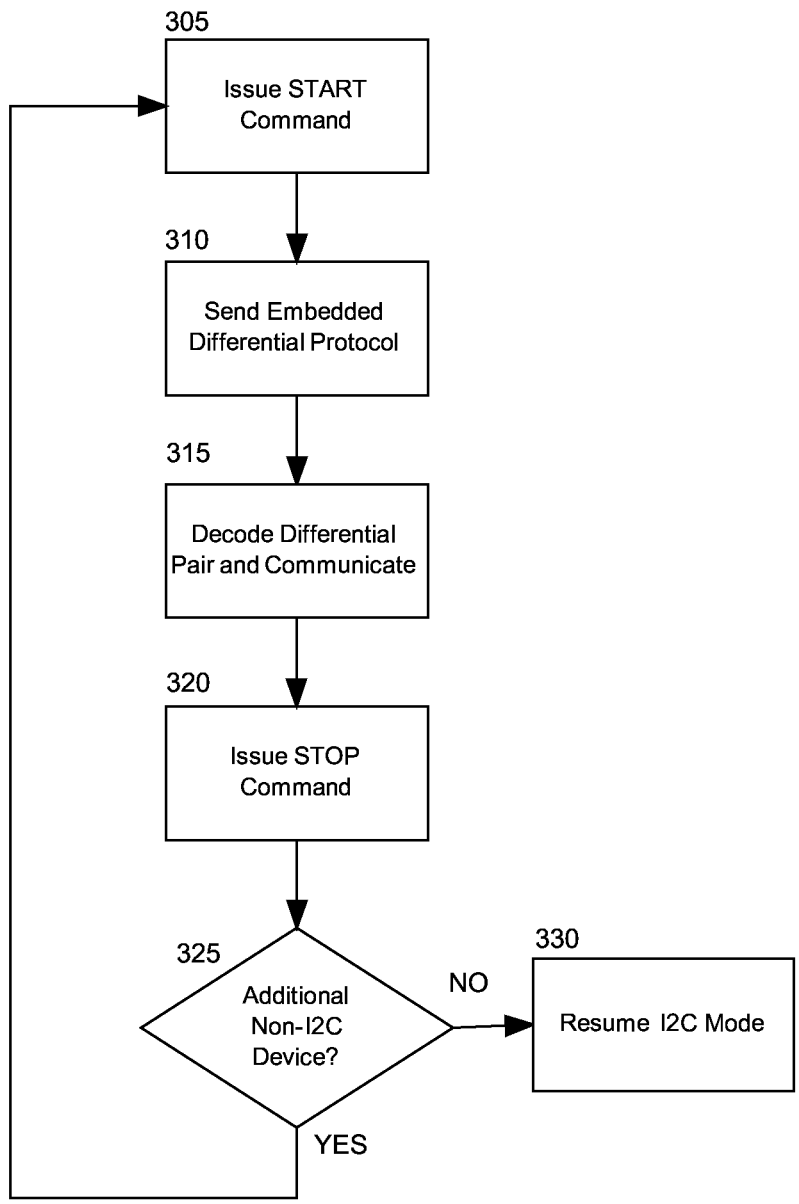

In yet further illustration, FIG. 3 is a flow chart illustrating a process for providing multiple protocols over an I2C bus in the data processing system of FIG. 1. Beginning in block 305, a bus management device 104 can issue a START command onto the I2C bus 103. In block 310, the bus management device 104 can send an embedded differential protocol to a non-I2C device 120. In block 315, the non-I2C device 120 can decode the embedded differential protocol and communicate with the bus management device 104.

In block 320, the bus management device 104 can issue a STOP command onto the I2C bus 103. In decision block 325, it can be determined if there are additional non-I2C devices to which communication is desired and if so, the bus management device 104 can issue a START command at block 305. Otherwise, in block 330, the I2C bus can resume normal I2C bus protocol operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for providing multi-protocol communication on an inter-integrated circuit (I2C) bus, the method comprising:
    issuing a start command by a bus management device onto the I2C bus;
    sending onto the I2C bus an embedded differential protocol by the bus management device to a non-I2C device; and
    issuing a stop command by the bus management device onto the I2C bus after the embedded differential protocol has been sent to the non-I2C device on the I2C bus.

2. The method of claim 1, further comprising decoding the differential protocol by the non-I2C device.

3. The method of claim 1, further comprising receiving a response to the embedded differential protocol from the non-I2C device.

4. The method of claim 1, wherein the differential protocol is a Universal Serial Bus (USB) protocol.

5. The method of claim 1, wherein the differential protocol is a Peripheral Component Interconnect Express Serial Bus (PCIe) protocol.

6. An I2C bus system configured for multi-protocol communication, the system comprising:
    a bus management device coupled to an expansion unit and the I2C bus; and,
    bus protocol selection logic coupled to the bus management device, the logic comprising program code enabled to issue a start command by a bus management device onto the I2C bus, to send an embedded differential protocol onto the I2C bus by the bus management device to a non-I2C device and to issue a stop command by the bus management device onto the I2C bus after the embedded differential protocol has been sent to the non-I2C device on the I2C bus.

7. The I2C bus system of claim 6, wherein the bus protocol selection logic further comprises program code to receive a response to the embedded differential protocol from the non-I2C device.

8. The I2C bus system of claim 6, wherein the differential protocol is a Universal Serial Bus (USB) protocol.

9. The I2C bus system of claim 6, wherein the differential protocol is a Peripheral Component Interconnect Express Serial Bus (PCIe) protocol.

10. A computer program product comprising a computer usable medium embodying computer usable program code for providing multi-protocol communication on an inter-integrated circuit (I2C) bus, the computer program product comprising:
    computer usable program code for issuing a start command by a bus management device onto the I2C bus;
    computer usable program code for sending onto the I2C bus an embedded differential protocol by the bus management device to a non-I2C device; and
    computer usable program code for issuing a stop command by the bus management device onto the I2C bus after the embedded differential protocol has been sent to the non-I2C device on the I2C bus.

11. The computer program product of claim 10, further comprising computer usable code for decoding the differential protocol by the non-I2C device.

12. The computer program product of claim 10, further comprising computer usable code for receiving a response to the embedded differential protocol from the non-I2C device.

13. The computer program product of claim 10, wherein the differential protocol is a Universal Serial Bus (USB) protocol.

14. The computer program product of claim 9, wherein the differential protocol is a Peripheral Component Interconnect Express Serial Bus (PCIe) protocol.

* * * * *